UNITED STATES PATENT OFFICE.

SAMUEL PEACOCK, OF BALTIMORE, MARYLAND, ASSIGNOR TO AMERICAN ACID COMPANY, OF BALTIMORE, MARYLAND, A CORPORATION OF MAINE.

PROCESS FOR THE RECOVERY OF SILICA, ALUMINA, AND POTASH FROM FELDSPAR.

1,030,122. Specification of Letters Patent. Patented June 18, 1912.

No Drawing. Application filed April 8, 1911. Serial No. 619,828.

*To all whom it may concern:*

Be it known that I, SAMUEL PEACOCK, a citizen of the United States, residing at Baltimore, in the State of Maryland, have invented certain new and useful Improvements in Processes for the Recovery of Silica, Alumina, and Potash from Feldspar; and I do hereby declare the following to be a full, clear, and exact description of the invention, such as will enable others skilled in the art to which it appertains to make and use the same.

This invention relates to a process for the recovery of silica alumina and potash from feldspar or from their otherwise naturally occurring combinations or associations and in which they are insoluble in water or in acids, or in other inexpensive solvents, and it has for its object to produce a process which will recover these compounds in a manner simpler, more expeditious and less expensive than heretofore proposed.

To these ends the invention consists in the novel steps constituting my process more fully hereinafter disclosed and particularly pointed out in the claims.

It is well known that the silica, alumina, potash and soda in feldspar is in such a condition that they have practically no commercial value beyond the use of this mineral in porcelain manufacture. The silica however, if rendered soluble and separated from the other oxids would be valuable as a cementitious product, or for glass making, as well as in other relations. The alumina if separated would be valuable for making alum cakes, metallic aluminum, as well as for the manufacture of certain abrasives, &c., while the potash if separated from the silica and alumina in such a form as to be soluble in water would be valuable as a plant food, in glass making, and in various chemical preparations requirng potash as an essential base or constituent. In other words, a ton of feldspar is worth industrially at best about $3.00, while its individual constituents separated as above would probably be worth industrially $25.00.

What is said above in connection with feldspar is also true in a somewhat lesser degree in regard to the various micas and silicious and aluminous minerals such as glauconite, rhyolite, leucite, Wyomingite, orendite, and generally in regard to all those naturally occurring minerals containing relatively large amounts of silica alumina, potash, or any two or these oxids. My process accordingly, is applicable to each and all of these minerals.

In carrying out my invention I will illustrate the employment of feldspar as an example for the base material, and when this material is used I reduce the same to a coarse powder and if crystalline I calcine it in any suitable furnace in order to convert it into the amorphous form. I then add to the calcined mineral a concentrated solution of potash or soda carbonate in such quantity that the alkali of the solution together with the alkali occurring naturally in the mineral itself is present in chemical equivalents equal to the silica present. That is to say, for each hundred pounds of silica there must be present 160 pounds of alkali, or in chemical proportions, of not more than two equivalents of potash to one equivalent of silica. The mixture of calcined mineral is ground to a fineness of not less than say 100 mesh as is usually done in the manufacture of Portland cement, and the resulting pulp is introduced into a digester or autoclave and treated with superheated steam at a pressure of substantially 5 atmospheres, and until all the silica present is converted into potassium or sodium silicate or both. The time of this digestion will vary, and depend upon the nature of the raw material under treatment, but it must be continued until all the silica present is converted into alkali silicates that are soluble in water.

At the end of the digestion process the contents of the digester is discharged into a suitable receiver and cooled, an air blast being preferably used for accomplishing the cooling. When cooled the solution of alkaline silicate is removed from the insoluble alumina by decantation or by a suitable filtration method. All of the alumina now remains as an insoluble hydrate, which contains a small percentage of the alkali used. The alumina pulp is then washed with water in an autoclave or other apparatus, and at substantially 5 atmospheres pressure or above, and treated while under this pressure with sufficient carbon dioxid $CO_2$ to convert all the alkali present into carbonates. The contents of the digester may be discharged directly into a filter press or other apparatus, and thoroughly washed with hot water, the washings being collected for re-use in the process. The filtered residuum consisting of practically pure alumina may be dehydrated in any suitable manner or otherwise prepared for industrial uses. The soluble alkaline silicates resulting from this process are also treated with carbon dioxid $CO_2$ for a time sufficient to convert all the alkali present into carbonates. The carbonated solution after cooling is treated for the separation of soluble alkaline carbonates and insoluble gelatinous silica by any suitable centrifugal or other apparatus, or they may be separated in a powerful filter press. The solution of alkaline carbonates obtained, may be concentrated for crystallization of the alkali in the form of carbonates in the usual manner, and the resulting mother liquors may be returned to the process.

It will thus be seen that by the process above disclosed, the alumina is isolated as such in a high state of purity, the silica is removed as an insoluble precipitate in a high state of purity, and in a highly active form for further use as an acid, while the potash or soda is collected in solution as a carbonate from which it may be largely removed in a high state of purity by concentration and crystallization. Further, it will be seen that all the incompletely isolated elements will collect in the mother liquors of the potash of soda, and as these are all returned to the process, there are no losses of mineral values. Further, if iron is present, it will separate with the alumina from which it may be isolated by any well known process.

What I claim is:—

1. The process of obtaining silica, alumina and potash from feldspar, which consists in converting said feldspar into the amorphous form; adding to said amorphous feldspar a solution of an alkali in such proportions that there will be present in the mixture not more than two chemical equivalents of alkali each equivalent of silica; heating the mixture and subjecting the same to the action of steam to form soluble alkali silicates; separating said silicates from the insoluble alumina present; treating said alumina with carbon dioxid to convert any alkali it may contain into a carbonate, and dehydrating the substantially pure alumina thus obtained; treating said soluble silicates with carbon dioxid to convert their contained alkalies into carbonates; and finally separating said carbonates from the silica present, substantially as described.

2. The steps in the art of obtaining silica, alumina and potash from feldspar, which consists in converting the feldspar into the amorphous form; adding sufficient alkali to cause the mixture to contain not more than two and not less than one equivalent of alkali to each equivalent of silica; treating the material with superheated steam to form therein soluble alkali silicates; separating from said silicates the alumina contained in the mixture; separating out any alkali that may be contained in the alumina; and suitably decomposing said silicates forming alkali carbonates and recovering the contained alkali, substantially as described.

In testimony whereof, I affix my signature, in presence of two witnesses.

SAMUEL PEACOCK.

Witnesses:
T. A. WITHERSPOON,
R. M. PARKER.